No. 779,242. PATENTED JAN. 3, 1905.
R. G. & G. SEGSCHNEIDER.
HAT BRIM CURLING MACHINE.
APPLICATION FILED OCT. 15, 1904.
5 SHEETS—SHEET 1.
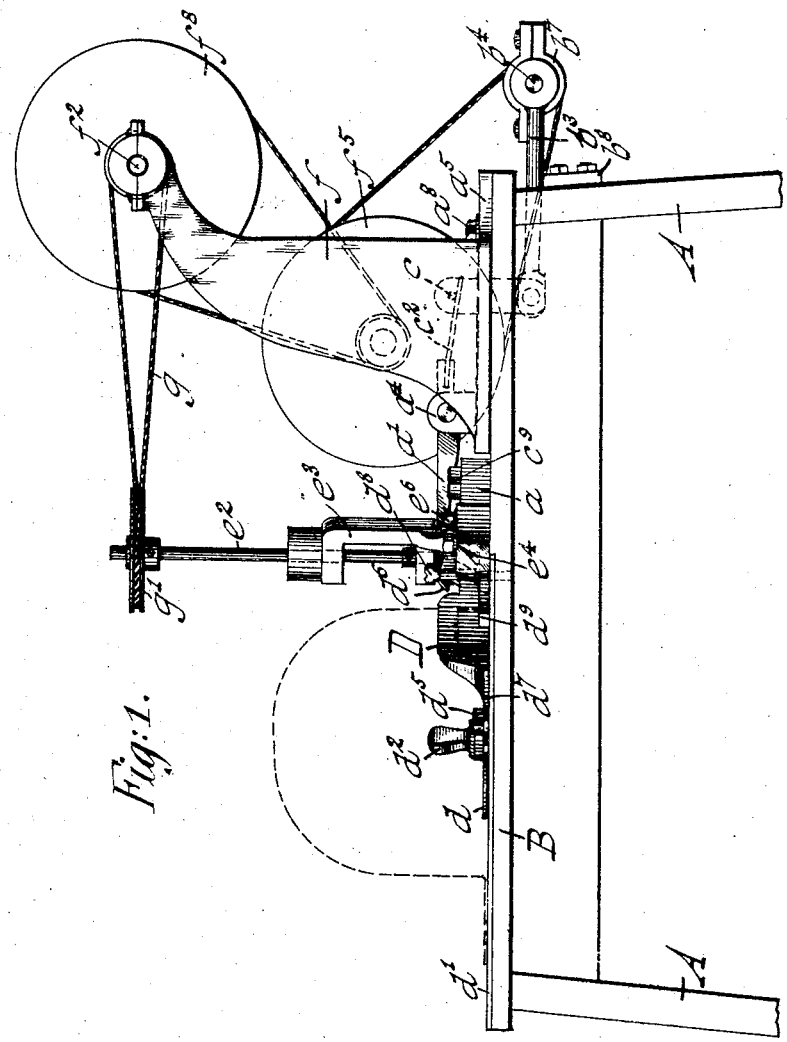

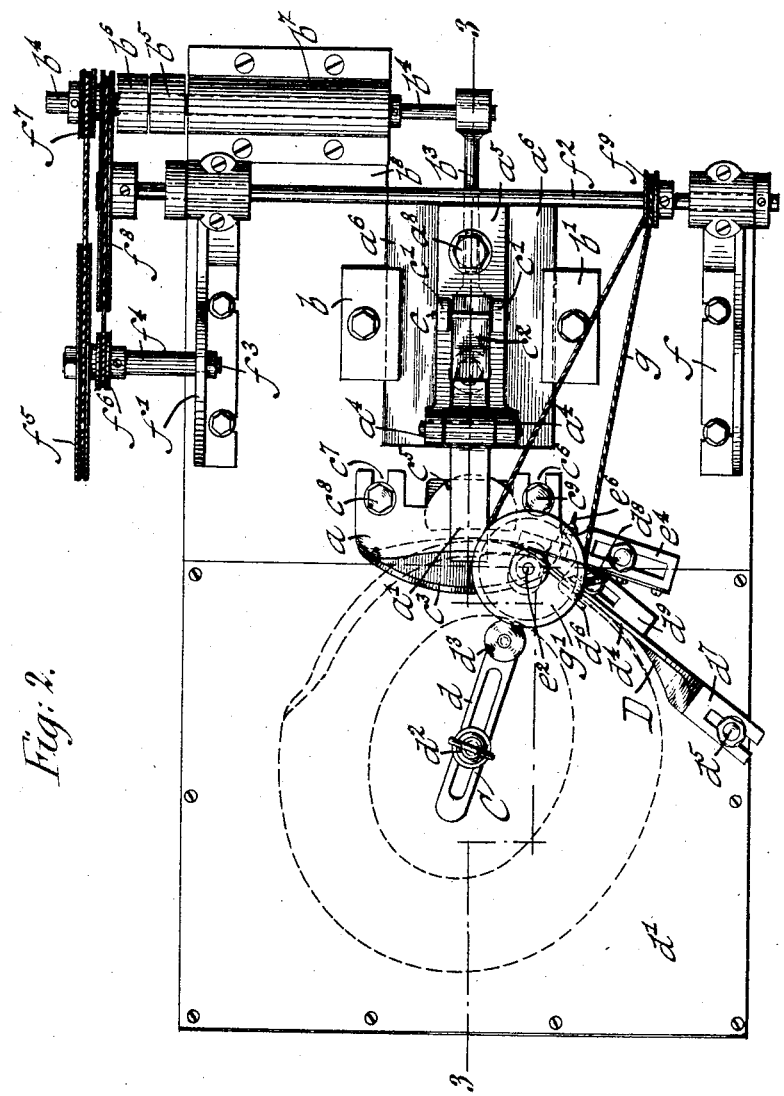

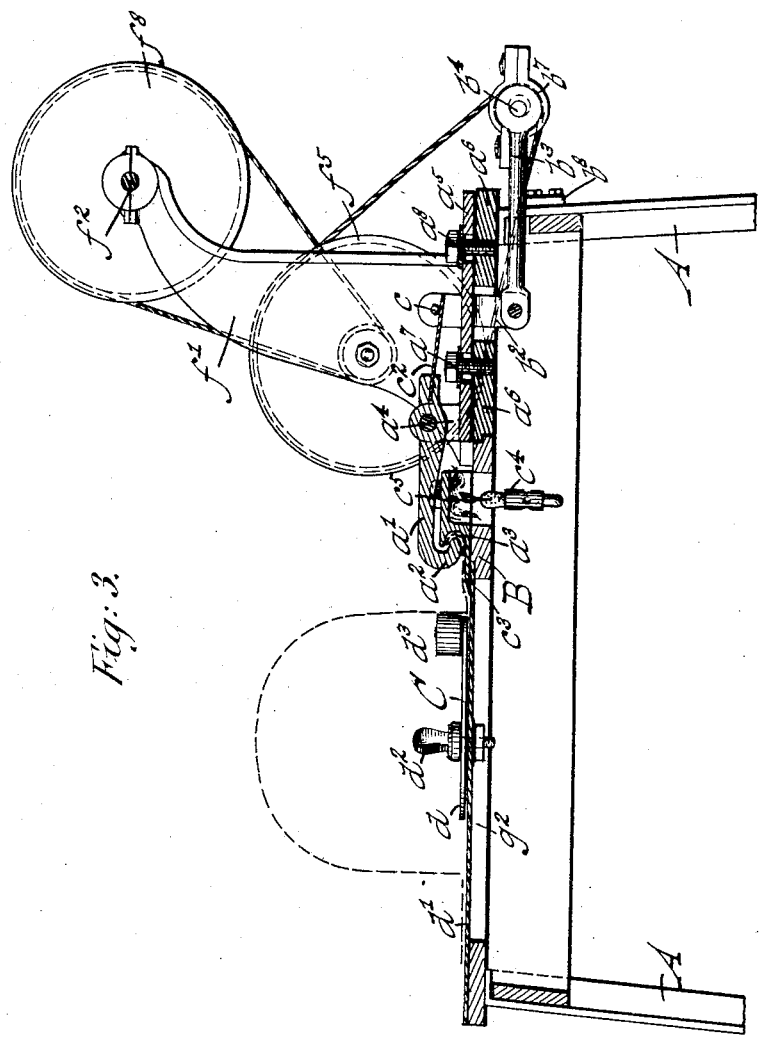

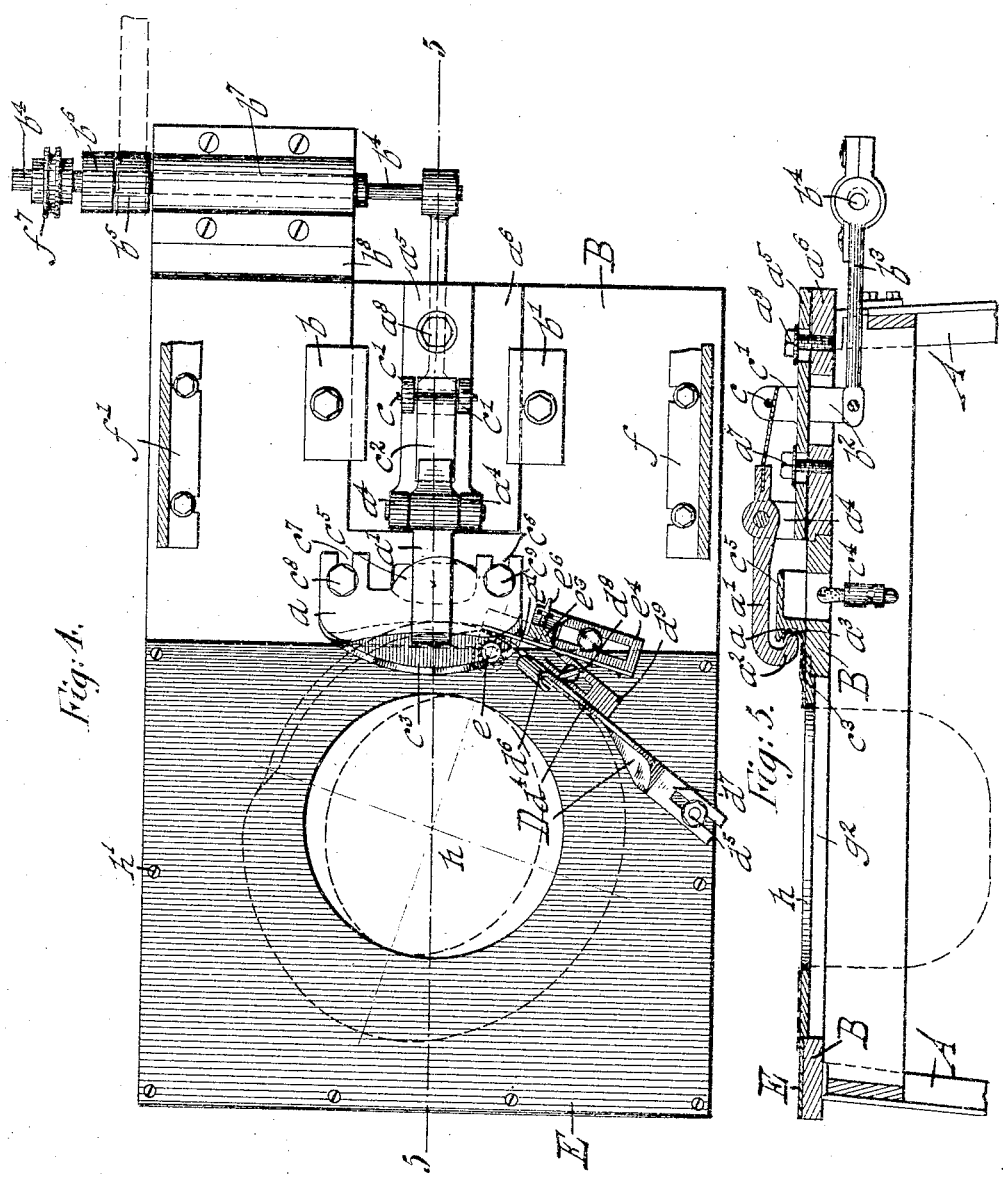

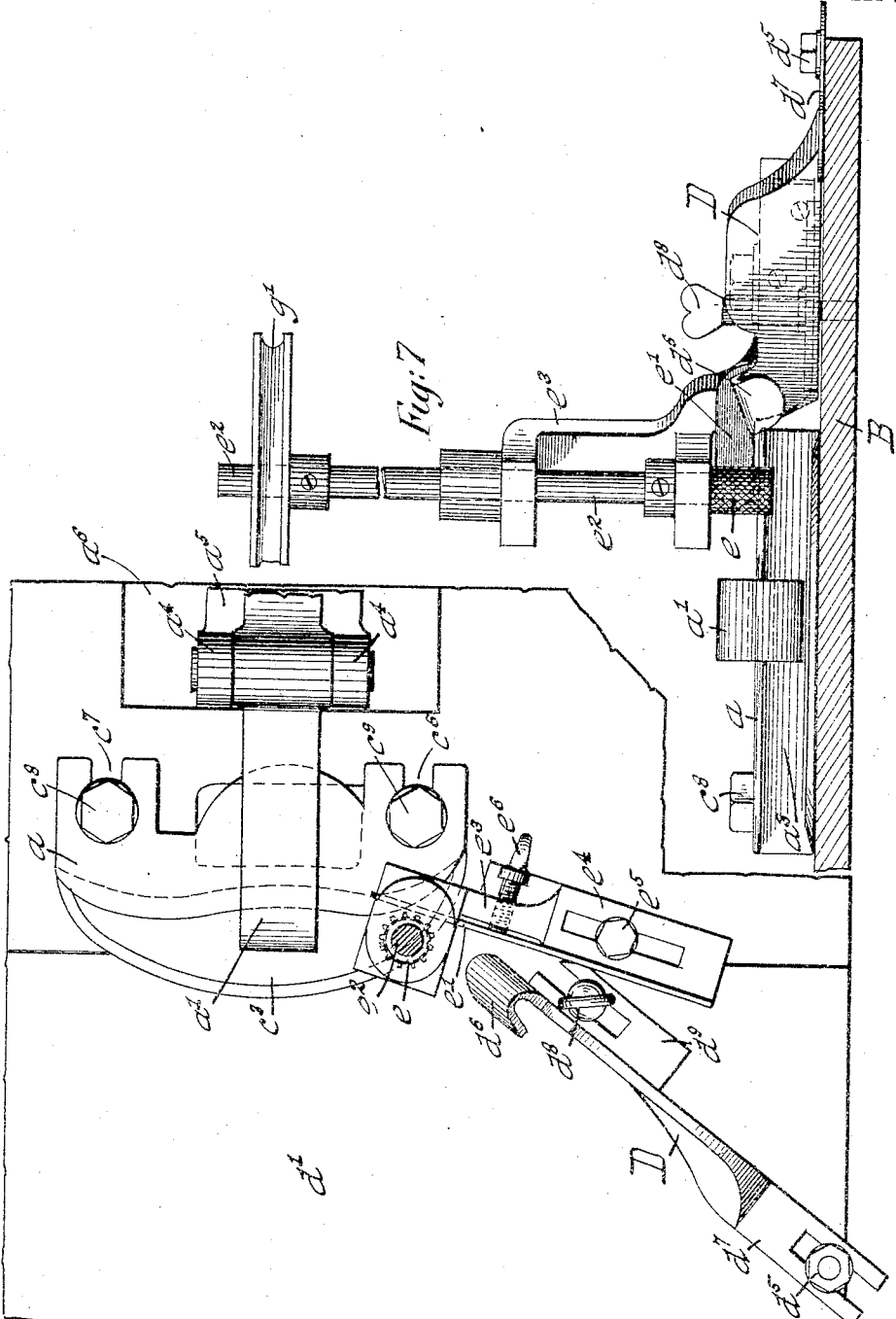

No. 779,242.                                    Patented January 3, 1905.

UNITED STATES PATENT OFFICE.

RUDOLPH G. SEGSCHNEIDER AND GUSTAV SEGSCHNEIDER, OF YONKERS, NEW YORK.

HAT-BRIM-CURLING MACHINE.

SPECIFICATION forming part of Letters Patent No. 779,242, dated January 3, 1905.

Application filed October 15, 1904. Serial No. 228,576.

*To all whom it may concern:*

Be it known that we, RUDOLPH G. SEGSCHNEIDER and GUSTAV SEGSCHNEIDER, both citizens of the United States, residing in Yonkers, in the county of Westchester and State of New York, have invented certain new and useful Improvements in Hat-Brim-Curling Machines, of which the following is a specification.

This invention relates to improvements in machines for curling the brims of hats, and more especially to improvements in that type of hat-brim-curling machines in which is employed a stationary brim-receiving curling-shoe and a curling-hammer adapted to coöperate therewith, such as shown, for instance, in a patent, No. 686,351, granted to us November 12, 1901. Certain of the improvements may be employed in connection with machines of other types.

The invention consists in certain combinations of parts and in certain details of construction, which will be fully described hereinafter and finally pointed out in the claims.

In the accompanying drawings, Figure 1 illustrates a side elevation of a machine embodying our invention. Fig. 2 is a top view of the same. Fig. 3 is a vertical longitudinal section on line 3 3, Fig. 2. Fig. 4 is a top view with parts removed and showing a modified construction of hat-holding means. Fig. 5 is a vertical longitudinal section on line 5 5, Fig. 4. Fig. 6 is a top view, on a larger scale, of the curling devices and adjacent parts of the machine shown in the preceding figures; and Fig. 7 is a front elevation of the parts shown in Fig. 6.

Similar letters of reference indicate corresponding parts.

Referring to the drawings, A indicates the frame of the machine, upon which is supported in any suitable manner or cast integral therewith a bed B. On the bed B is mounted a curling-shoe $a$ of suitable size and shape to receive a portion of the brim of the hat to be curled.

$a'$ indicates a curling-hammer which is provided with a nose $a^2$, adapted to enter a groove $a^3$ of the curling-shoe for curling the brim between the same. The curling-hammer is pivotally supported between uprights or lugs $a^4$ of a carriage $a^5$, secured removably to and guided upon a carriage-bed $a^6$ by screws $a^7 a^8$. Said carriage-bed $a^6$ is itself secured removably by means of removable keepers $b\ b'$ to the bed B of the machine. It may thereby be removed as a whole without disturbing the hammer or other parts of the machine. To the carriage $a^5$ is connected, by any suitable means—as, for instance, lugs, one of which, $b^2$, is shown depending through a longitudinal slot in the carriage-bed $a^6$—a connecting-rod $b^3$, the opposite end of which is connected eccentrically to a driving-shaft $b^4$, actuated by power from any suitable source. The driving-shaft is supported in suitable bearings $b^7$ of a bracket $b^8$, secured to the frame of the machine or made integral therewith, or the shaft may be supported in any other suitable manner. It is provided with tight and loose pulleys $b^5\ b^6$, respectively.

In our machine shown in the patent hereinbefore referred to the hammer was counterbalanced by means of a weight at its rear portion. Under rapid reciprocation there was a tendency to oscillation of the hammer upon its pivot when thus counterbalanced. In order to secure increased steadiness and reliability in positioning of the hammer, the same is in the present machine counterbalanced by means of a spring $c^2$, secured to the hammer and extending rearwardly therefrom beneath a rest-pin $c$, supported between lugs $c'$, rising from the carriage $a^5$. A more effective action of the hammer is thereby secured.

In order to prevent abrasion of that portion of the hat-brim overlying the lower outer edge of the shoe, which was of frequent occurrence in machines heretofore constructed, the shoe, according to the present invention, is provided with an extension $c^3$ at its lower portion, which extension projects forwardly—*i. e.*, toward the hat-supporting-plate, beyond the outermost limit of the path of the hammer in said direction—so that the hammer cannot contact with the edge of the shoe during its reciprocations. For heating the shoe a gas-burner $c^4$ or other suitable heating device is provided, projecting upwardly through an opening in the bed B of the machine and arranged to support the flame beneath an overhanging wing $c^5$ at the rear portion of the shoe. In order to secure convenient and quick adjustment of the space between the hammer and the shoe, the shoe is made adjustable, and the connecting-rod $b^3$, which in our former machine was provided with devices for adjusting its length, is now preferably made solid, thus rendering the construction simpler and reducing liability of damage arising from accidental shifting of adjusting devices. The shoe $a$ is rendered adjustable by means of slots $c^6$ $c^7$ in the body of the same, through which extend screws $c^8$ $c^9$, securing said shoe removably to the bed-plate B.

For guiding the hat a crown-guide C is provided, comprising a slotted arm $d$, adjustably secured to the hat-supporting plate $d'$ by means of a thumb-screw $d^2$ and carrying at its outer end a roller $d^3$, adapted to bear against the crown of the hat.

For upturning the outer portion of the brim of the hat to be curled prior to the passage of said portion between the curling devices a brim-guide is provided, said guide comprising an arm $d^4$, secured adjustably to the hat-supporting plate $d'$ or to the frame of the machine or to any other suitable point of support by means of a screw-bolt $d^5$. Said arm is of such shape as to receive the outer portion of the brim against it and cause the gradual upturning of said brim, as indicated in dotted lines in Fig. 2. At its outer portion said arm is preferably provided with a hook $d^6$, which is downwardly inclined toward the curling devices, as indicated in Fig. 1. By this hook the upturned portion of the brim is prevented from falling over and is properly guided in substantially vertical position toward the curling devices. Said arm and guide serve also as means determining the width of brim permitted to pass toward the curling devices. Said guide is vertically adjustable. It is normally spring-actuated in upward direction by means of a spring $d^7$, forming the rear portion of the arm $d^4$, and its adjustment and movement in said direction is limited and controlled by means of a thumb-screw $d^8$ engaging a lug $d^9$, projecting from the back or outer face of the arm $d^4$, as indicated in the drawings. Said lug is slotted in substantially the same direction as the spring portion $d^7$ of the arm $d^4$, and thereby the adjustment of the guide D in longitudinal direction—namely, tangentially to the hat-brim—is permitted. When the thumb-screw $d^8$ is turned so as to depress the arm $d^4$ and hook $d^6$, the brim of the hat to be curled is upturned to a less width, and thereby a less width of brim permitted to pass within range of the curling devices. When the thumb-screw $d^8$ is turned so as to permit the arm $d^4$ and hook $d^6$ to rise under the influence of spring $d^7$, a greater width of the brim is permitted to be upturned and to pass beneath the hook and within range of the curling devices.

Between the guide D and the curling devices is arranged a feeding device comprising a feed-roller $e$, having a suitably-roughened face and a coöperating spring-actuated and adjustable finger $e'$, between which the brim is adapted to be received with slight pressure sufficient so that upon the turning of the roller the brim is advanced from the guide D toward and through the curling devices. The roller is supported in preferably approximately vertical position and rotated by means of a shaft $e^2$, journaled in a suitable standard $e^3$, supported adjustably upon the bed-plate B of the machine. The lower portion of the standard is provided with a foot $e^4$, slotted, as indicated clearly in Figs. 2 and 6, and a bolt or screw $e^5$, passing through said slot, secures the device in position. By the adjustment thus afforded the feeding device may be adjusted to the exact point desired on the circumferential line of the hat-brim between the guide D and feeding device or laterally to either side of said line and may be readily and accurately positioned for accomplishing the best feeding action. The feeding-finger $e'$ is preferably made of spring metal. It is secured at one portion to the foot or other suitable part of the standard $e^3$ of the feeding device, and at its forward portion is borne against by a thumb-screw $e^6$, adapted to force the finger more or less toward the feeding-roller or to permit its retreat therefrom, and thereby adjust the space between the feeding-roller and feeding-finger to the width best suited for the particular brim being fed. The feeding-roller $e$ is driven by means of a speed-reducing mechanism between the shaft $e^2$ and the main driving-shaft $b^4$ of the machine. Upon the bed B of the machine are removably secured standards $f$ $f'$, in which is journaled a counter-shaft $f^2$. One of said standards, as $f'$, also supports a stud-shaft $f^3$, upon which is arranged a sleeve $f^4$, carrying a large pulley $f^5$ and a small pulley $f^6$. From the large pulley $f^5$ a belt extends to a small pulley $f^7$ on said main shaft $b^4$, and from the small pulley $f^6$ extends a belt to a large pulley $f^8$ on the counter-shaft. The counter-shaft is also provided with a small pulley $f^9$, from which extends a belt $g$ over a large pulley $g'$ on the shaft $e^2$. By these means the speed of the feed-roller is greatly reduced from that of the main shaft $b^4$, so that many reciprocations of the curling-hammer $a'$ take place during one rotation of the feed-roller. By varying the sizes of the pulleys various relative speeds of feed may be obtained, according to the particular requirements of the material to be curled.

For curling brims in downward direction—*i. e.*, producing a lap or hem at the lower side of a brim instead of at the upper side—for which work the curling devices of the machine are adapted, the bed B of the machine is provided with an opening $g^2$, as indicated in Fig. 3, and across this opening is placed a hat-supporting plate E, provided with an opening $h$ above the opening of the bed, said opening $h$ being of sufficient size to receive the crown of the hat when the hat is placed in inverted position. The hat thus lies, as indicated in Fig. 5, upon the hat-plate E, with its brim in such position as to be guided, fed, and folded or curled in the manner referred to for curling at the upper side of the brim, the guide, feeding device, and curling devices being so adjusted as to produce the desired curl. In order that the machine may be readily changed from condition for curling in one direction to that of curling in the other, the plate E is made removable, the same being secured by screws $h'$ or other suitable means to the bed B or frame of the machine, whereby it may be readily removed and the corresponding full plate $d'$ be substituted therefor, being secured in similar manner in proper position on the bed. The crown-guide $d\ d^2\ d^3$, heretofore referred to and preferably employed in connection with the full plate $d'$, is not necessarily employed with the open plate E, inasmuch as the hat is guided at the crown by contact of the same with the edge of the plate at the opening $h$, as indicated in dotted lines in Fig. 4.

It is obvious that many modifications may be made in the details of construction described without departing from the spirit of our invention. The speed-reducing mechanism may be modified. It may comprise either a belt and pulley transmission, as shown, or a series of gears and pinions. The forms of the guides may be varied according to the particular style of the hat being fed and the material from which the same is made, and the proportions of the various parts may be obviously altered as required for the purpose of adapting them to any such requirements.

Having thus described our invention, we claim as new and desire to secure by Letters Patent—

1. In a hat-brim-curling machine, the combination, with brim-curling devices, of a brim-feeding device arranged in advance of said brim-curling devices and comprising a roller and an adjustable finger coöperating therewith.

2. In a hat-brim-curling machine, the combination, with brim-curling devices, of means for upturning a hat-brim, and a brim-feeding device arranged between said brim-upturning means and said curling devices.

3. In a hat-brim-curling machine, the combination, with brim-curling devices, of means for upturning a hat-brim, and a feeding device between said brim-upturning means and said curling devices, said feeding device comprising a feed-roller and an adjustable and spring-actuated finger coöperating therewith.

4. In a hat-brim-curling machine, the combination, with brim-curling devices, of adjustable means for upturning a hat-brim, and a feeding device between said brim-upturning means and said curling devices, said feeding device comprising a feed-roller and an adjustable and spring-actuated finger coöperating therewith.

5. In a hat-brim-curling machine, the combination, with brim-curling devices, of adjustable means for upturning a hat-brim, and an adjustable feeding device between said brim-upturning means and said curling devices, said feeding device comprising a feed-roller, and an adjustable and spring-actuated finger coöperating therewith.

6. In a hat-brim-curling machine, the combination, with brim-curling devices, of longitudinally-adjustable means for upturning a hat-brim, and a longitudinally and laterally adjustable feeding device between said brim-upturning means and said curling devices, said feeding device comprising a feed-roller and an adjustable and spring-actuated finger coöperating therewith.

7. In a hat-brim-curling machine, the combination, with brim-curling devices, a driving-shaft, and motion-transmitting mechanism between said brim-curling devices and driving-shaft, of a feeding device comprising a spring-actuated finger, a vertically-arranged feed-roller coöperating therewith, and motion-transmitting mechanism between said driving-shaft and feed-roller.

8. In a hat-brim-curling machine, the combination, with reciprocating brim-curling devices, a driving-shaft, and motion-transmitting mechanism between said brim-curling devices and driving-shaft for rapidly reciprocating said curling devices, of a feeding device comprising a spring-actuated finger, a vertically-arranged feed-roller coöperating therewith, and motion-transmitting and speed-reducing mechanism between said driving-shaft and feed-roller.

9. In a hat-brim-curling machine, the combination, with brim-curling devices, of a stationary horizontal hat-plate having an aperture adapted to receive the crown of the hat when the latter is in inverted position and located to position the hat with the brim thereof engaged in said curling devices.

10. In a hat-brim-curling machine, the combination, with brim-curling devices, of a brim-feeding device in advance of said brim-curling devices, and a stationary horizontal hat-plate having an aperture adapted to receive the crown of the hat when the latter is in inverted position and located to position the hat with the brim thereof in engagement with said feeding device and the curling devices.

11. In a hat-brim-curling machine, the combination, with brim-curling devices, of adjustable means for upturning a hat-brim, a brim-feeding device in advance of said brim-curling devices, and a stationary horizontal hat-plate having an aperture adapted to receive the crown of the hat when the latter is in inverted position and located to position the hat with the brim thereof in engagement with said curling devices, feeding device and brim-upturning device.

12. In a hat-brim-curling machine, the combination of a reciprocating hammer, and a shoe extending beyond the same when in advanced position.

13. In a hat-brim-curling machine, the combination, with brim-curling devices, of a vertically-adjustable brim-guide.

14. In a hat-brim-curling machine, the combination, with brim-curling devices, of a spring-actuated vertically-adjustable brim-guide.

15. In a hat-brim-curling machine, the combination, with brim-curling devices, of a vertically-adjustable brim-guide spring-actuated away from the brim-path, and means for limiting the movement of said guide.

16. In a hat-brim-curling machine, the combination, with a curling-shoe, of a spring-balanced coöperating curling-hammer.

17. In a hat-brim-curling machine, the combination, with a curling-shoe, of a curling-hammer, means for imparting reciprocatory motion thereto, a bed-plate, a longitudinally-slotted carriage for said hammer, set-screws passing through the slots of said carriage and secured in said bed-plate, and means connecting said motion-imparting means with said carriage.

18. In a hat-brim-curling machine, the combination, with a curling-shoe, of a reciprocatory hammer, a carriage for said hammer, a support, and a bed-plate for said carriage removably secured to said support.

19. In a hat-brim-curling machine, the combination of an adjustable brim-curling shoe, and a reciprocating coöperating curling-hammer.

20. In a hat-brim-curling machine, the combination, with a bed-plate, of brim-curling devices mounted thereon, said bed-plate having an open frame portion adjacent said devices, a hat-plate, and means securing the same removably in position at the open frame portion of said bed-plate.

21. In a hat-brim-curling machine, the combination, with brim-curling devices, brim-feeding devices, and a driving-shaft, of motion-transmitting mechanism between said curling devices and driving-shaft, and speed-reducing motion-transmitting mechanism between said feeding devices and driving-shaft.

In testimony that we claim the foregoing as our invention we have signed our names in presence of two subscribing witnesses.

RUDOLPH G. SEGSCHNEIDER.
GUSTAV SEGSCHNEIDER.

Witnesses:
ROBERT EDGAR,
CHAS. WURSTER.